US012462626B2

(12) United States Patent
Ouellette (10) Patent No.: US 12,462,626 B2
(45) Date of Patent: *Nov. 4, 2025

(54) METHODS AND SYSTEMS FOR INTEGRATING AUTONOMOUS DEVICES WITH AN ACCESS CONTROL SYSTEM

(71) Applicant: Tyco Fire & Security GmbH, Neuhausen am Rheinfall (CH)

(72) Inventor: Jason M. Ouellette, Sterling, MA (US)

(73) Assignee: TYCO FIRE & SECURITY GMBH, Neuhausen Am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,102

(22) Filed: Nov. 20, 2023

(65) Prior Publication Data

US 2024/0296703 A1    Sep. 5, 2024

Related U.S. Application Data

(63) Continuation of application No. 17/570,283, filed on Jan. 6, 2022, now Pat. No. 11,861,959.

(51) Int. Cl.
*G07C 9/00* (2020.01)
(52) U.S. Cl.
CPC ................ *G07C 9/00182* (2013.01)
(58) Field of Classification Search
CPC .................................................. G07C 9/00182
See application file for complete search history.

(56) References Cited

U.S. PATENT DOCUMENTS

| 5,682,142 | A  | * | 10/1997 | Loosmore | G07C 9/28 340/286.07 |
|---|---|---|---|---|---|
| 9,905,101 | B1 | * | 2/2018 | Billau | H04W 4/80 |
| 10,264,433 | B2 | * | 4/2019 | Ahearn | H04W 12/06 |
| 10,852,751 | B2 | * | 12/2020 | Scanu | G05D 1/0088 |
| 11,798,340 | B1 | * | 10/2023 | Xu | G07C 9/30 |
| 2003/0210127 | A1 | * | 11/2003 | Anderson | G06F 21/36 340/5.27 |
| 2005/0052275 | A1 | * | 3/2005 | Houle | G08B 21/0261 340/5.3 |
| 2008/0055041 | A1 | * | 3/2008 | Takene | G07C 9/28 340/5.7 |
| 2009/0192647 | A1 | * | 7/2009 | Nishiyama | G06V 20/56 901/30 |
| 2010/0085152 | A1 | * | 4/2010 | Fukuda | G06V 40/50 340/5.82 |
| 2010/0171589 | A1 | * | 7/2010 | Haberli | H04B 13/005 70/91 |

(Continued)

*Primary Examiner* — Curtis J King
(74) *Attorney, Agent, or Firm* — ArentFox Schiff LLP (57) ABSTRACT

Apparatus and methods for integrating autonomous devices with an Access Control System (ACS) includes assigning, by the ACS, one or more security credentials to an autonomous device. The ACS receives an access request from an autonomous device. The access request includes one or more security credentials identifying the autonomous device to the system. The ACS performs validation of the received access request by comparing the received one or more security credentials with the one or more security credentials assigned to the autonomous device. The ACS grants access to one or more resources in a building to the autonomous device, in response to successful validation of the received access request.

20 Claims, 6 Drawing Sheets

(56) References Cited

U.S. PATENT DOCUMENTS

| | | | |
|---|---|---|---|
| 2013/0038448 A1* | 2/2013 | Chong | G07C 9/27 340/541 |
| 2013/0127615 A1* | 5/2013 | Snodgrass | G06F 21/35 340/5.61 |
| 2015/0088310 A1* | 3/2015 | Pinter | B25J 9/1676 901/1 |
| 2015/0199863 A1* | 7/2015 | Scoggins | G07C 9/28 340/5.25 |
| 2017/0175413 A1* | 6/2017 | Curlander | B64F 1/10 |
| 2017/0185085 A1* | 6/2017 | Storfer | G08G 1/207 |
| 2017/0225336 A1* | 8/2017 | Deyle | B25J 11/008 |
| 2019/0147676 A1* | 5/2019 | Madzhunkov | H04N 23/10 340/5.2 |
| 2019/0172284 A1* | 6/2019 | Herget | B25J 5/007 |
| 2019/0210833 A1* | 7/2019 | Laakso | B66B 5/0018 |
| 2019/0248002 A1* | 8/2019 | Deyle | B25J 19/023 |
| 2019/0248013 A1* | 8/2019 | Deyle | B25J 13/006 |
| 2019/0248014 A1* | 8/2019 | Deyle | B25J 13/085 |
| 2019/0248016 A1* | 8/2019 | Deyle | B25J 13/006 |
| 2019/0337154 A1* | 11/2019 | Holson | B25J 9/1697 |
| 2020/0031616 A1* | 1/2020 | Li | B66B 1/3461 |
| 2020/0050206 A1* | 2/2020 | Deyle | G01S 13/876 |
| 2020/0053324 A1* | 2/2020 | Deyle | G01C 21/20 |
| 2020/0053325 A1* | 2/2020 | Deyle | H04N 7/185 |
| 2020/0061839 A1* | 2/2020 | Deyle | G06Q 10/087 |
| 2020/0290202 A1* | 9/2020 | Zhou | B25J 9/1697 |
| 2021/0008722 A1* | 1/2021 | Pinter | G16H 40/67 |
| 2021/0046650 A1* | 2/2021 | Deyle | G05D 1/0214 |
| 2021/0046655 A1* | 2/2021 | Deyle | B25J 9/1664 |
| 2021/0048829 A1* | 2/2021 | Deyle | G05D 1/0274 |
| 2021/0080926 A1* | 3/2021 | Rubinson | G05B 19/19 |
| 2021/0209882 A1* | 7/2021 | Kuenzi | H04W 4/00 |
| 2021/0269280 A1* | 9/2021 | Venkatachalam | H04W 12/72 |
| 2021/0283777 A1* | 9/2021 | Gou | B25J 13/087 |
| 2021/0284494 A1* | 9/2021 | Zhang | B66B 1/3461 |
| 2021/0295624 A1* | 9/2021 | Koliparthi | G07C 9/00182 |
| 2021/0339399 A1* | 11/2021 | Schluntz | G05D 1/0088 |
| 2021/0342479 A1* | 11/2021 | Schluntz | H04L 63/107 |
| 2021/0373573 A1* | 12/2021 | Hofmann | A62C 37/04 |
| 2022/0033216 A1* | 2/2022 | Noguchi | B66B 1/3461 |
| 2022/0234194 A1* | 7/2022 | Deyle | B25J 18/007 |
| 2022/0262183 A1* | 8/2022 | Oda | G07C 9/38 |
| 2023/0094967 A1* | 3/2023 | Cianciolo | B66B 5/0012 187/316 |
| 2023/0110004 A1* | 4/2023 | Bloomgren | B66B 1/468 187/388 |
| 2023/0211978 A1* | 7/2023 | Siman Tov | B66B 1/3476 187/392 |
| 2023/0271806 A1* | 8/2023 | Belov | B66B 1/3492 187/380 |
| 2023/0382683 A1* | 11/2023 | Kori | B66B 1/3407 |
| 2024/0010463 A1* | 1/2024 | Zhang | B66B 1/468 |
| 2024/0020968 A1* | 1/2024 | Haskin | G06F 16/29 |

* cited by examiner

METHODS AND SYSTEMS FOR INTEGRATING AUTONOMOUS DEVICES WITH AN ACCESS CONTROL SYSTEM

CROSS-REFERENCE TO RELATED APPLICATIONS

The present application is a continuation of U.S. patent application Ser. No. 17/570,283, entitled "METHODS AND SYSTEMS FOR INTEGRATING AUTONOMOUS DEVICES WITH AN ACCESS CONTROL SYSTEM," and filed on Jan. 6, 2022, the contents of which are expressly incorporated by reference herein in the entirety.

TECHNICAL FIELD

The present disclosure generally relates to access control, and more specifically, to integrating autonomous devices with an Access Control System (ACS).

BACKGROUND

Security systems are often installed within and around buildings such as commercial buildings, residential buildings, or governmental buildings. Examples of these buildings include offices, hospitals, warehouses, schools or universities, shopping malls, government offices, and casinos. The security systems typically include components such as access system controllers, access control readers, video surveillance cameras, network video recorders (NVRs), and door controllers, to list a few examples.

The access control readers are often installed at access points of the buildings to control access to restricted areas, such as buildings or areas of the buildings. Examples of access points include front and interior doors of the buildings, elevators, hallways connecting two areas of a building, to list a few examples. The access control readers authenticate identities of (or authorize) individuals and then grant/deny access to the restricted areas through the access points to those individuals based on results of the authentication results.

Typically, individuals interact with the access control readers by swiping keycards or bringing contactless smart cards within range (approximately 2-3 inches or 5 centimeters) of the reader. The access control readers read the information of the keycards and then the access control systems determine if the individuals are authorized to access the restricted areas. If the individuals are authorized to enter the restricted areas, then the access control readers or system controller allow access to the restricted areas by unlocking locked doors or signaling that doors should be unlocked. However, conventional access control readers are not equipped for such interactions with autonomous devices, such as robots and Unmanned Aerial Vehicles (UAVs).

In view of the foregoing, there is a need to efficiently and securely control access of autonomous devices to restricted areas.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure relates to an ACS that is integrated with autonomous devices. In some cases, the ACS can automatically receive and validate credentials from the autonomous devices to provide access to a restricted area. Advantageously, the autonomous device may use location awareness to trigger an access request in contrast to conventional card swipe. If access is granted to the autonomous device, in response to the received access request, then the ACS may provide an unlock door request and/or destination request to an elevator via a software driver, rather than through a conventional card read request.

One example implementation relates to a method for integrating autonomous devices with an ACS. One aspect of the method includes assigning, by an ACS, one or more security credentials to an autonomous device. An access request from autonomous device is received by the ACS. The access request includes one or more security credentials. The validation of the received access request is performed by the ACS by comparing the received one or more security credentials with the one or more security credentials assigned to the autonomous device. The ACS grants access to one or more resources in a building to the autonomous device, in response to successful validation of the received access request.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

This disclosure relates to systems, devices, and methods for managing and controlling access of autonomous devices, such as drones and robots, to restricted areas by providing a mechanism for autonomous devices to request and gain access to doors and/or elevators, among other indoor resources which provide access to one or more restricted areas. In particular, in the present disclosure, the disclosed system provides audit and tracking capabilities that are extended to a wider area that can be covered by an autonomous device, such as a single robot or drone, in an indoor environment.

Figure 1:
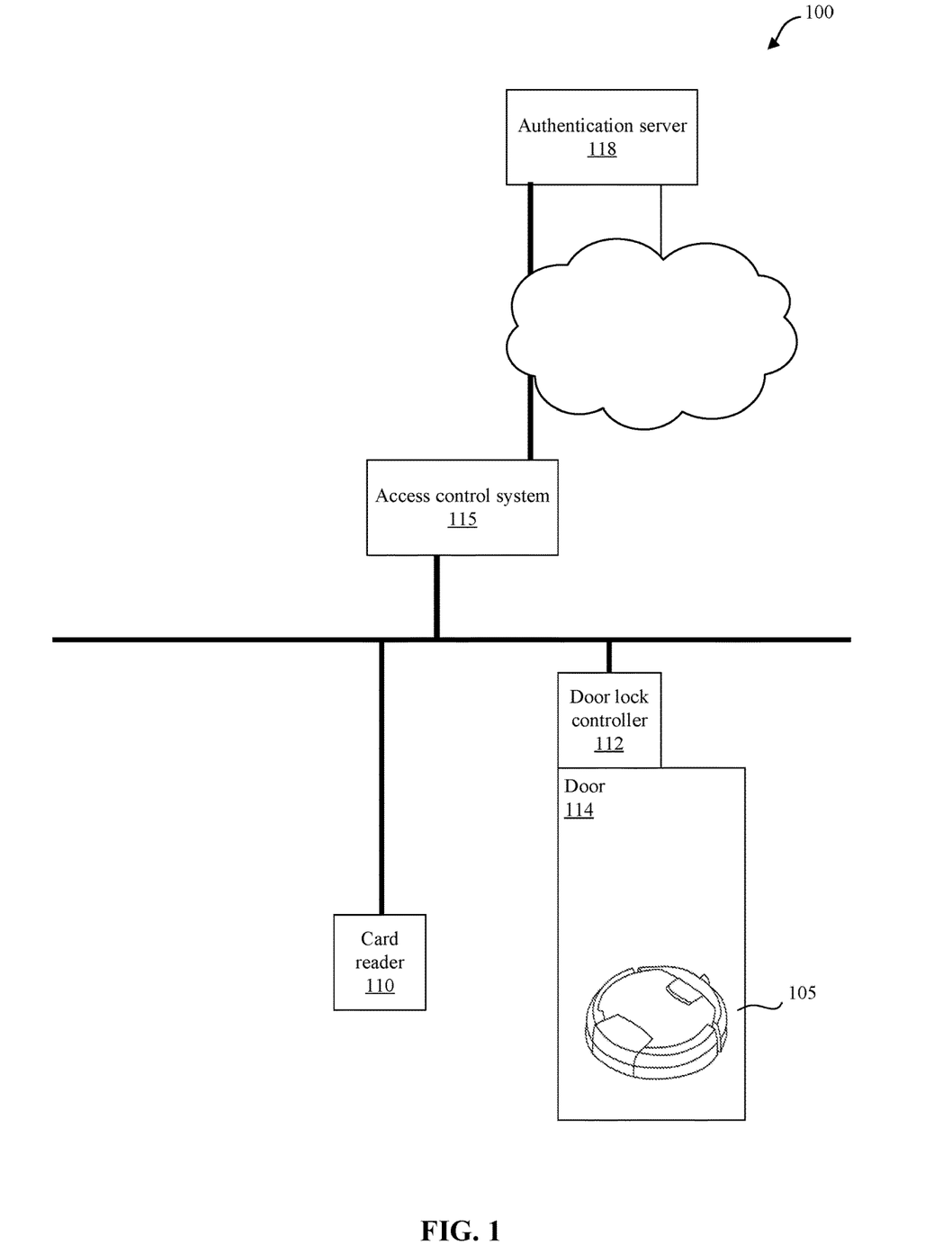
FIG. 1 is an example of a block diagram illustrating security system with an ACS that has been constructed in accordance with aspects of the present disclosure.

FIG. 1 is an example of a block diagram illustrating a security system 100 with an ACS that has been constructed according to the aspects of the present disclosure.

In more detail, the authentication access control system 100 is configured to interact with autonomous devices 105, such as robots and UAVs (e.g., drones). The system 100 includes a connection between an on premise access control system controller 115 to an authenticating authority server 118, which may be located on premises or at a remote location, for example.

Such authentication servers allow for external systems to authenticate users with known accounts. Here, the authentication server 118 is configured to authenticate autonomous devices 105 with known credentials on the access control system 100. In an aspect, the access control system 100 may enroll autonomous devices 105 using provided security credentials.

The access control system 100 enables an authenticated autonomous devices 105 to obtain access to a restricted area controlled by the access control card reader 110. The autonomous device 105 may determine proximity to a restricted area, closed door and/or elevator based on current location of the autonomous device 105. The autonomous device 105 may determine the need for an access request based on the proximity information. In an aspect, the autonomous device 105 sends an access request containing one or more security credentials uniquely identifying the autonomous device 105 to the access control system controller 115. The autonomous device 105 may support more than one security credential in the event of a multiple tenant facility having more than one access control system controllers 115. In response to receiving the security credentials from the autonomous device 105, the access control system controller 115 sends an authentication request to the authentication server 118. The authentication request may contain one or more security credentials of the autonomous device 105. The authentication server 118 may reply to the access control system controller 115 with one or more security credentials that have been previously assigned to the autonomous device 105, for example, during device registration process. In an aspect, the access control system controller 155 may compare the security credentials received from the autonomous device 105 and from the authentication server 118. If the credentials match, the access control system controller 115 may send a command to the access control reader 110 to grant access to the autonomous device 105. If the credentials do not match, the access control system controller 115 may send a command to the access control reader 100 to deny access to the autonomous device 105. In an alternative aspect, the comparison of the security credentials may be performed by the authentication server 118. In this case, the authentication server 118 may send authentication results to the access control system controller 115. The access control system controller 115 may send the command to either grant or deny access to the autonomous device 105 based on the authentication results.

In an aspect, the security credentials may be assigned by an identity management system. The identity management system may be separated into the two main components: security management services and access management services. The security management services is a set of components that provides identity management for individuals, autonomous devices, products, and organizations. The security management services performs functions such as identity management, user registration, user account administration, client administration and product administration. The access management services is a set of components that enforce user authentication.

This architecture can be used to eliminate the need for additional hardware at the door 114 while still providing the necessary authentication for an autonomous device 105 prior to access being granted through the door or portal 114. In other words, providing the ability of a robot or UAV to open a door and/or to push an elevator button adds complexity and cost to the autonomous device 105, which is undesirable.

In general, the autonomous device 105 may need connectivity to the internet or at least limited connectivity to the access control system 115. The on premise access control system 115 provides for management and configuration of the access control rules being applied to the door 114. The on premise access control system controller 115 communicatively couples with both the autonomous devices 105 and the authentication server 118. The door lock controller 112 maintains the lock/unlock status of the door 114. In an aspect, in response to the access being granted to the autonomous device 105, the door lock controller 112 may automatically open the door 114 for the autonomous device 105. In an aspect, the on premise access control system controller 115 is configured to audit/track movement of the autonomous device 105. In other words, the access control system controller 115 may store information about each access request in a log file. Such information may include autonomous device's 105 identifier, one or more security credentials, travel destination and a timestamp. Such log files may be used at a later time to track exact movement and location of the autonomous device 105 at any point in time. Finally, the authenticating authority server 118 may enable the autonomous device 105 to have one or more assigned credentials for operation across multiple access control or identity management platforms. In other words, same credentials may authenticate the autonomous device 105 across multiple access control or identity management systems if each of those systems communicates with the authentication server 118. In an aspect, multiple credentials may be used to support multi-tenant environments. Furthermore, different card readers may have different configurations/requirements. For example, one card reader may support a ten-digit number as a security credential, while a different card reader in the same building may require a complex 256-bit number.

In an aspect, the communication between the autonomous device 105 and the access control system 115 may be facilitated by a network service layer often categorized as a "middleware" service. A Machine-to-Machine (M2M)/Internet-of-Things (IoT) service layer is targeted towards M2M/IoT devices and applications. An M2M service layer may provide applications and devices access to a collection of M2M-oriented capabilities supported by the service layer. A few examples of such capabilities include security, charging, data management, device management, discovery, provisioning, and connectivity management. These capabilities are made available to applications via Application Program Interfaces (APIs) which make use of message formats, resource structures and resource representations defined by the M2M service layer. In an aspect, the access request generated by the autonomous device 105 may include security credentials identifying the autonomous device to the access control system controller 115.

Figure 2:
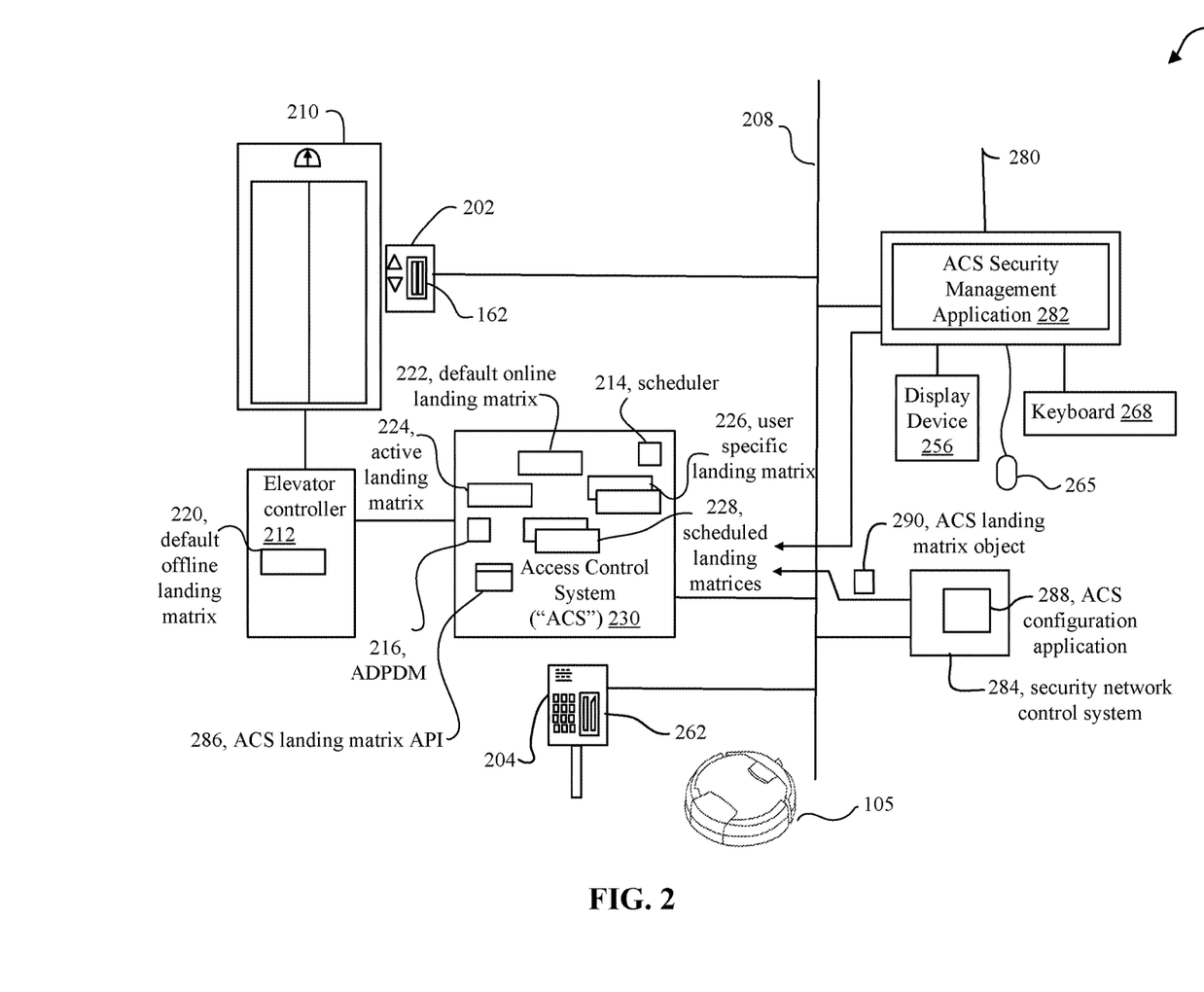
FIG. 2 is an example of a schematic illustrating an elevator system that includes an ACS that communicates with autonomous devices and an elevator controller, in accordance with aspects of the present disclosure.

FIG. 2 is an example of a schematic illustrating an elevator system 200 that includes an ACS 230 that communicates with autonomous devices 105 and an elevator controller 212, in accordance with aspects of the present disclosure. The ACS 230 may be the same as or similar to the ACS 115 of FIG. 1. The elevator controller 212 controls one or more elevators 210. The ACS 230 connects to a security network 208. Operators of the elevator system 200, such as security guards, configure one or more landing matrices for the ACS 230. The landing matrices include information such as the list of floors for the elevator system, and the elevator doors front and/or rear for each elevator car.

The ACS 230 includes one or more landing matrices that define the access to the floors for the elevator controller 212. When the communications between the ACS 230 and the elevator controller 212 are active, the ACS 230 sends a landing matrix to the elevator controller 212 for controlling access to the floors served by the elevators 210. The elevator controller 212 includes a default offline landing matrix 220 in the event that the communications fail between the ACS 230 and the elevator controller 212.

The landing matrices also include a default online landing matrix 222 that specifies access to floors without taking into consideration user credentials, and one or more user-specific landing matrices 226 that include user credential information from users. In an aspect, the ACS 230 may create the device-specific matrices for one or more autonomous devices 105, in response to receiving an electronic request to obtain access to the elevator 210 over the security network 208. The device-specific matrices may include a desired location for the autonomous device 105. The ACS 230 may determine the desired location based on the information received in the access request, such as, but not limited to a travel destination. Such access request may include credentials of the autonomous device 105. Such device-specific matrices may control elevator door opening and closing, elevator dispatch, and elevator security based on the security credential of the autonomous device 105. For example, such device-specific matrix may open the elevator door only at a desired location (e.g., floor 3 which is a travel destination) for the autonomous device 105.

While the ACS 230 stores one or more landing matrices, only one landing matrix at any given time is sent by the ACS 230 to the elevator controller 212 for controlling the access to the floors. This is also known as an active landing matrix 224. The active landing matrix 224 is the matrix sent by the ACS 230 to the elevator controller 212 for granting the access to the floors served by the elevators 210 when the connection between the elevator controller 212 and the access control system 230 is active. In an aspect, the active landing matrix 224 may only grant autonomous device 105 access to the specific floors served by the elevators 210.

The ACS 230 also includes scheduled landing matrices 228 that the ACS 230 schedules with its scheduler 214. A scheduled landing matrix 228 becomes the active landing matrix 224 during the scheduled time of the scheduler 214. Once the scheduler 214 completes, the ACS 230 reverts to using the active landing matrix 224 utilized prior to the scheduling event, which is typically the default online landing matrix 222.

In an aspect, the ACS 230 additionally includes an ACS landing matrix API 286 that accepts ACS landing matrix objects 290 included within messages over the security network 208. In response to receiving the ACS landing matrix objects 290, the ACS landing matrix API 286 reads the ACS landing matrix objects 290, creates new landing matrices from the ACS landing matrix objects 290, and performs operations upon the stored landing matrices using the ACS landing matrix objects 290.

In an aspect, the ACS 230 also includes Autonomous Device Processing and Decision Management (ADPDM) module 216. The ADPDM module 216 may be configured to process access requests received from autonomous devices and configured to grant/deny such access. If the ADPDM module 216 makes a decision to grant access to a particular autonomous device, the ADPDM 216 may also send a software request to unlock a door or call an elevator, for example.

Users may request access to the elevator system 200 via access card readers 262 included within Destination Operation Panels ("DOP") 204 and Car Operation Panels ("COP") 202. The card reader 262 may be the same as or similar to the card reader 110 of FIG. 1. COPs 202 are located within an elevator car of the elevator 210, or mounted outside elevator doors of the elevator 210. DOPs 204 are typically located in entrance areas within close proximity of an elevator lobby. Instead of presenting physical access cards to the card reader 262 the autonomous device 105 may send an electronic request that includes device's credentials to the ACS 230.

In an aspect, personnel, such as security guards, configure access permissions to the elevator system 200 via a security guard workstation 280 and a security network control system 284. The security guard workstation 280 and the security network control system 284 connect to the security network 208. The security guard workstation 280 has a display device 256, a pointing device 265, such as a mouse or touchscreen, and a keyboard 268. The security guard workstation 280 may include an ACS security management application 282.

In typical elevator systems 200, one vendor manufactures the majority of the components that communicate over the security network 208, such as the elevator controller 212, the ACS 230, the COPs 202 and DOPs 204. In addition, vendors provide full management and configuration for these components via vendor-specific security ACS security management applications 282 on the security guard workstation 280.

In contrast, the security network control system 284 is typically a third party system, the capabilities of which are limited to configuration and management of the ACS 230 and its landing matrices via the ACS configuration application 288.

Aspects of the present disclosure enable a robot walking up to an elevator automatically obtaining permission to use the elevator. In response to receiving the access request from the robot, the elevator may go from one point to another point without guard assistance. In other words, a robot or UAV may trigger a security check by walking around a building typically in a known pattern.

It should be noted that an autonomous device may be configured to perform a variety of tasks and/or functions, which may change over a lifespan of the given autonomous device. The examples and technical features of the autonomous devices which are described below in connection with the treatment of a floor space are for illustrative purposes only. It should be noted that such autonomous devices may also perform other activities or additional activities. The activities performed by the autonomous device described may also comprise, for example, the inspection of the floor space or the environment, the transport of objects, the investigation of fire alarms, the cleaning of air and/or the performance of entertainment games. A treatment module is not necessarily required, for example, when the autonomous device is solely used for inspection.

Figure 3:
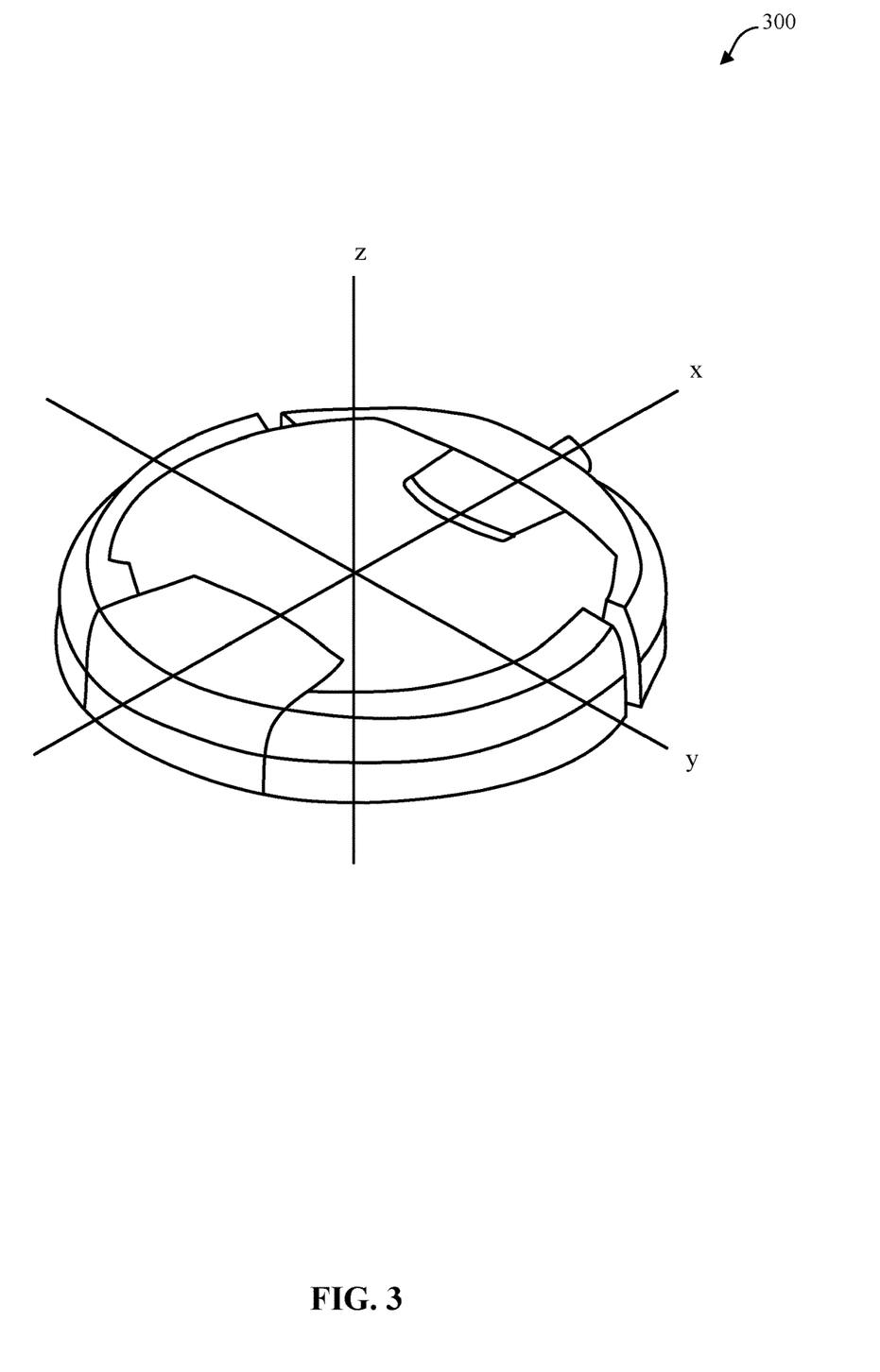
FIG. 3 is an example of a schematic isometric illustration of an autonomous device in a form of a self-propelled robot for autonomously cleaning floor spaces, in accordance with aspects of the present disclosure.

FIG. 3 shows, by way of example, a schematic isometric illustration of au autonomous device 105 shown in FIG. 1. In this particular case, the autonomous device 105 comprises a self-propelled robot 300 for autonomously cleaning floor spaces. FIG. 3 also shows a Cartesian coordinate system with the origin in the center of the robot 300. Such devices are often—but not necessarily—in the form of a disk. The vertical axis z passes through the center of the disk. The longitudinal axis is denoted with x and the transverse axis is denoted with y.

The robot 300 comprises a drive module (not illustrated) which may have electric motors, gears and wheels, for example. The drive module may be designed, for example, to move the robot in the forward and reverse directions (this would be along the x axis in the illustration from FIG. 3) and to rotate the robot about the vertical axis (this would be the z axis in the illustration from FIG. 3). Therefore, the robot may—theoretically—approach any point of a floor space (which is parallel to the plane defined by the x axis and y axis). The robot also comprises a treatment module, for example a cleaning module, which is designed to clean the floor space under (and/or beside) the robot. For example, dust and dirt particles are drawn into a collection container or conveyed into the latter in a mechanical (or any other) manner. In an aspect, the robot 300 may be configured to communicate with the ACS 230 to gain access to some restricted areas of the building. Furthermore, the robot 300 may have capability of travelling vertically (between floors, for example) by communicating with the elevator system 200.

Figure 4:
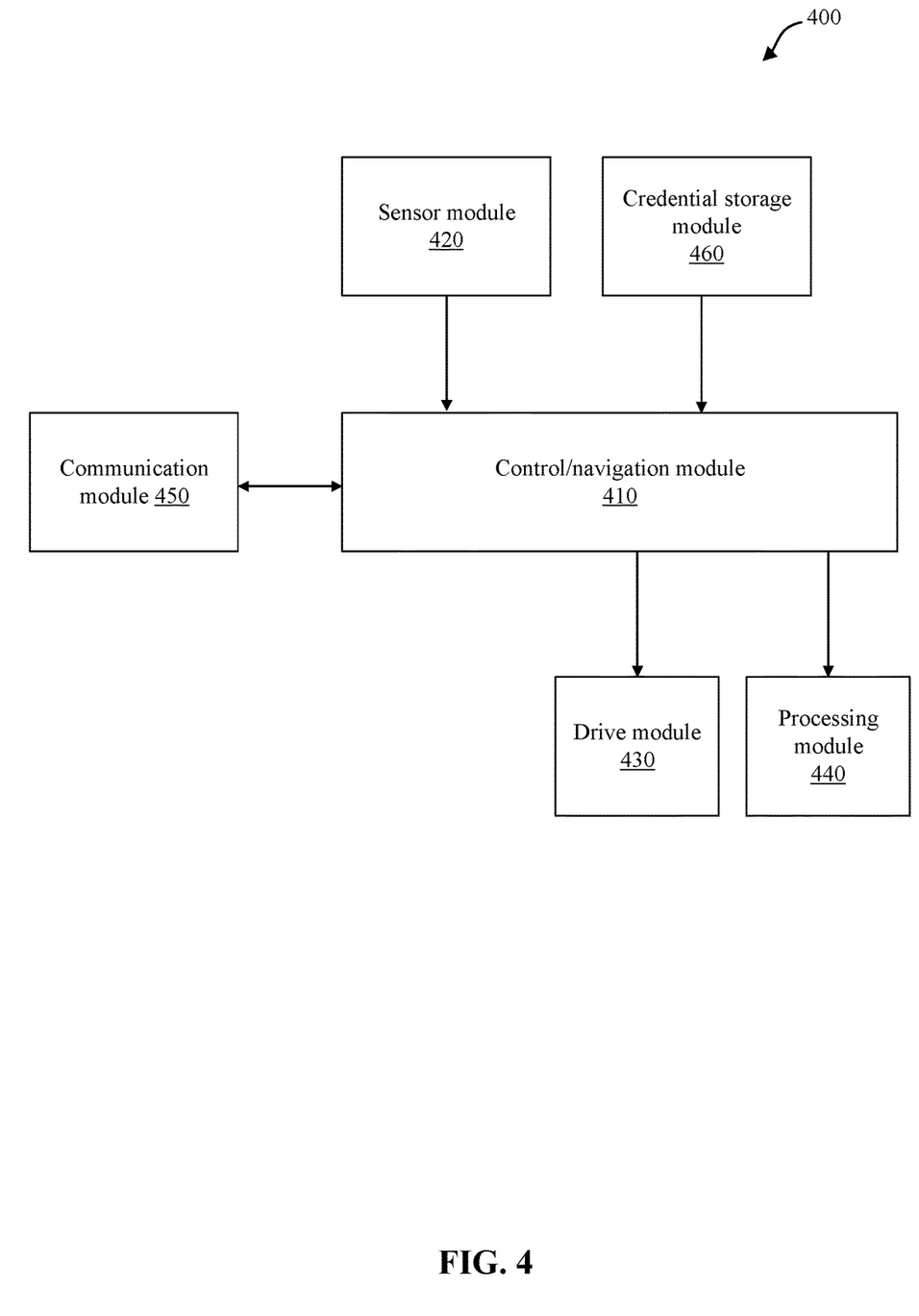
FIG. 4 is an example of a block diagram illustrating an autonomous device, in accordance with aspects of the present disclosure.

FIG. 4 is an example of a block diagram illustrating an autonomous device 400, in accordance with aspects of the present disclosure.

A drive module 430 and a processing module 440, such as a treatment module, which have already been mentioned above are illustrated. Both modules 430 and 440 are controlled by a navigation and control module 410. The navigation module 410 is configured to navigate the robot 300 across the floor space to reach its desired destination using a map of the environment. In this case, the map may be stored in a memory of the navigation and control module 410.

The entire communication and interaction with the ACS 230 and/or the elevator system 200 may take place via the communication module 450, and so the access requests containing robot's credentials may also be transmitted via the communication module 450.

Since communication between the robot 300 and the ACS 230 and/or the elevator system 200 is a security-critical aspect, a secure communication interface may be used. The transmitted data could be encrypted, for example. SSL encryption (Secure Socket Layer encryption) would be possible for this. An asymmetrically encrypted connection could also be established using keys or certificates which cannot be read and are stored in the hardware. Furthermore, message IDs could be used as verification in order to avoid playback attacks, for example. Message IDs contained in the encrypted message might have to obey a certain sequence. An alarm could be triggered, for example, in the case of incorrectly transmitted IDs. Said encryption methods and various other encryption methods are generally known and shall therefore not be explained in any more detail.

In an aspect, a credential storage module 460 may store one or more security credentials assigned to the autonomous device 400. In an aspect, each of the one or more security credentials may comprise an integer value, a Globally Unique Identifier (GUID), a public key or some other means of a unique identification of the autonomous device 400 to the ACS 230. As described above, the autonomous device 400 incorporates the security credentials securely stored in the credential storage module into each access request sent to the ACS 230.

The robot 300 also comprises a sensor module 420 for acquiring information relating to the structure of the environment and/or relating to properties of the floor space. For this purpose, the sensor module 420 may have one or more sensor units which are designed to acquire information, on the basis of which a map of the environment may be constructed and the position of the robot on the map may be located. Sensors which are suitable for this purpose are, for example, laser range scanners, cameras, triangulation sensors, contact sensors for detecting a collision with an obstacle, etc. The sensor module 420 may also identify or detect, for example, the card readers 262 which are identified in the map.

The sensor units may also be used, for example, to detect any possible irregularities in the area to be cleaned. In this case, irregularities may be, for example, foreign objects, persons, smoke or fire. The robot 300 could itself detect, for example, foreign objects or movements using optical sensors, for example. However, it would also be conceivable, for example, for the sensor module 420 to comprise thermal imaging cameras or sensors with a similar function. If one of the sensors is triggered, this may be transmitted to the alarm installation which may then initiate corresponding actions.

Contact sensors in the sensor module 420 may detect a collision, for example, and current sensors for measuring the load current of the drive unit may be used, for example, to detect when the robot is stuck (for example on the fringes of a rug). Other sensor units may detect sticking of the robot, for example, by the spinning of the drive wheels. It is possible to provide further sensor units which are designed, for example, to determine the degree of soiling of the floor. The acquired environmental information may be transmitted to the navigation and control module 410 together with a position of the robot on the map, which position is associated with the respective information.

It would also be possible for the robot 300 to be sent to a particular region of a building. If the security personnel detect irregularities in region A1, for example, the robot 300 may be sent into the alarm zone in order to take photographs of the environment there, for example. For example, images or videos could be recorded using the sensor module 420. These could be transmitted to the security personnel so that the latter may get an idea of the alarm zone in advance. The permanent storage of the maps is advantageous in this case since quick and reliable approach by the robot 300 is enabled.

Figure 5:
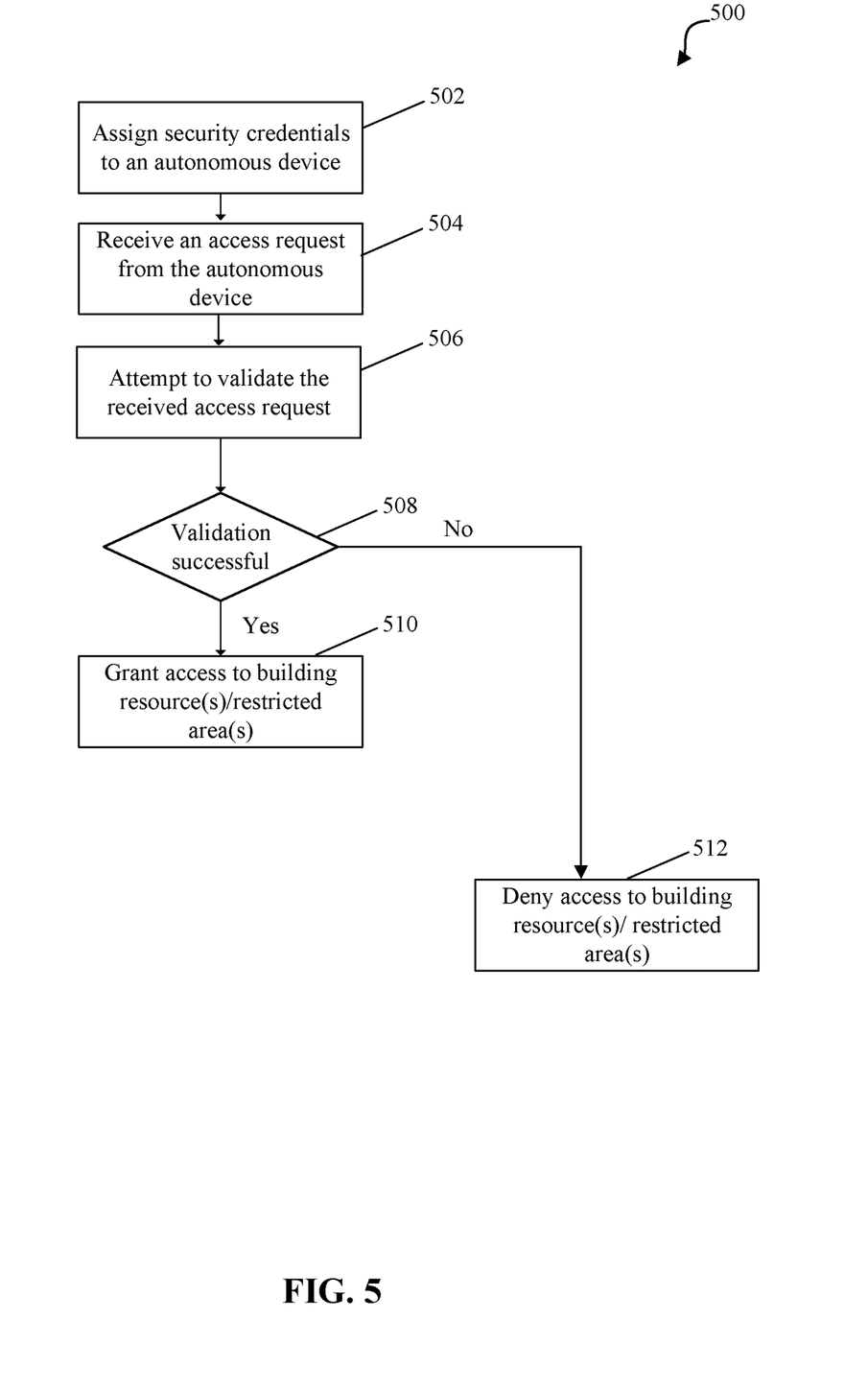
FIG. 5 is an example of a flowchart illustrating a method of integration of an ACS with autonomous devices, in accordance with aspects of the present disclosure.

FIG. 5 is an example of a flowchart illustrating a method 500 of integration of an ACS with autonomous devices, in accordance with aspects of the present disclosure. FIGS. 1-4 may be referenced in combination with the flowchart of FIG.

5. At step 502, the ACS 230 may assign security credentials to an autonomous device. The assigned security credential may be stored by the credential storage module 460 of the autonomous device 400. Alternatively, at step 502, the autonomous device 400 may provide the security credential stored in the credential storage module 460 to the ACS 230. In response, the ACS 230 may use the received security credential to enroll the autonomous device 400, as long as the provided security credential uniquely identifies corresponding device to the ACS 230. In an aspect, the security credentials may be assigned by an identity management system. In an aspect, the autonomous device comprises one of: a robot (such as robot 300 shown in FIG. 3) and an Unmanned Aerial Vehicle (UAV) (such as drone). In an aspect, there may be an object defined for each autonomous device 105 in the ACS 230. Furthermore, different roles may be assigned to such object, such as, for example, a robot for autonomously cleaning floor spaces. One or more security credentials assigned to each autonomous device 105 allow access to restricted areas.

At step 504, when the autonomous device 105 approaches a restricted area, it may send an access request to the ACS 230. In an aspect, the communication between the autonomous device 105 and the ACS 230 may be facilitated by a network service layer often categorized as a "middleware" service. In an aspect, the access request generated by the autonomous device 105 may include security credentials identifying the autonomous device to the ACS 230. In an aspect, the security credentials may include a digital identity token uniquely identifying the autonomous device 105. In addition, the access request may include the travel destinations assigned to the autonomous device 105, the clearances and/or access levels granted to the autonomous device 105. For example, the access request may indicate that a particular robot is only allowed to visit certain floors. Other floors could be covered by a different robot, for example.

At step 506, the ACS 230 may attempt to validate the received access request by comparing the received security credentials with the security credentials assigned to the autonomous device 105. In some aspects, the authentication server 118 may be configured to authenticate autonomous devices 105 with known credentials on the ACS 230.

At step 508, the ACS 230 may determine whether the validation was successful. If the validation was successful (step 508, "Yes" branch), the ACS 230 may grant access to one or more resources in a building to the autonomous device 105 (step 510). For example, the building may have areas of restricted access (for example areas with a security zone controlled by access card readers). Furthermore, the building may have areas where travel is prohibited due to construction or maintenance, or areas that are not barrier free. In one non-limiting example, granting access may include opening the door to a restricted area within the building. The ACS 230 is configured to assist the autonomous devices 105 to reach a desired destination. In one non-limiting example, granting access may include opening the door to one or more restricted areas within the building on the path towards autonomous device's 105 travel destination. Advantageously, step 510 may be performed by the ACS 230 directly using software requests (e.g., open door requests, elevator call requests, etc.) to manage the access to doors and/or elevators, effectively eliminating the need for an arm and/or physical credential reader.

In another non-limiting example, the step of granting access may include sending, by the ACS 230, an elevator call to the elevator system 200. In one aspect, the ACS 230 may send the contents of the active landing matrix to the elevator controller 212. The active landing matrix 224 is the matrix sent by the ACS 230 to the elevator controller 212 for granting the access to the floors served by the elevators 210. In an aspect, the active landing matrix 224 may only grant autonomous device 105 access to the specific floors served by the elevators 210 based on device's security credentials.

In an optional aspect, the autonomous device 105 may detect a tailgating event by comparing the video generated by the sensor module 420 (e.g., a video camera, radar, infrared camera and the like). The tailgating event may be detected and/or confirmed, if the autonomous device 105 detects a person, animal and/or another autonomous device closely following it, while the access to the restricted area is being granted. Optionally, if the tailgating event is confirmed, the autonomous device 105 may send a signal to the ACS 230 indicating such an event and to prevent the unauthorized access by the follower. In an optional aspect, the autonomous device 105 may output a corresponding message indicating a tailgating event that is visible to a follower and/or may generate an audible alert. At least in some cases, to prevent the unauthorized access, the ACS 230 may ask the elevator controller 212 to go to the person's (follower's) desired floor first.

If the validation was not successful (step 508, "No" branch), the ACS 230 may deny access to one or more resources in a building to the autonomous device 105 (step 512).

In other words, the method 500 includes a method for integrating autonomous devices with an ACS. The method includes assigning, by an access control system, security credentials to an autonomous device. The ACS receives an access request from an autonomous device. The access request includes security credentials identifying the autonomous device to the system. The ACS performs validation of the received access request by comparing the received security credentials with the security credentials assigned to the autonomous device. The ACS grants access to one or more resources in a building to the autonomous device, in response to successful validation of the received access request.

In one or any combination of these aspects, the autonomous device includes one of: a robot and an Unmanned Aerial Vehicle (UAV).

In one or any combination of these aspects, the one or more resources in the building includes a door to a restricted area of the building. In this aspect, granting access includes automatically opening the door for the autonomous device.

In one or any combination of these aspects, the one or more resources includes an elevator. In this aspect, granting access includes automatically sending, by the ACS, an elevator call to an elevator control system.

In one or any combination of these aspects, the security credentials include travel destination for the autonomous device within the building. In this aspect, granting access includes granting access, by the ACS and/or elevator dispatch system, to the one or more resources on a path towards the travel destination.

In one or any combination of these aspects, the method may further include auditing movement of the autonomous device based on the security credential.

In one or any combination of these aspects, the method may further include controlling elevator door opening and closing, elevator dispatch, and elevator security based on the security credential.

In one or any combination of these aspects, the method may further include opening the elevator door at a desired location for the autonomous device.

Figure 6:
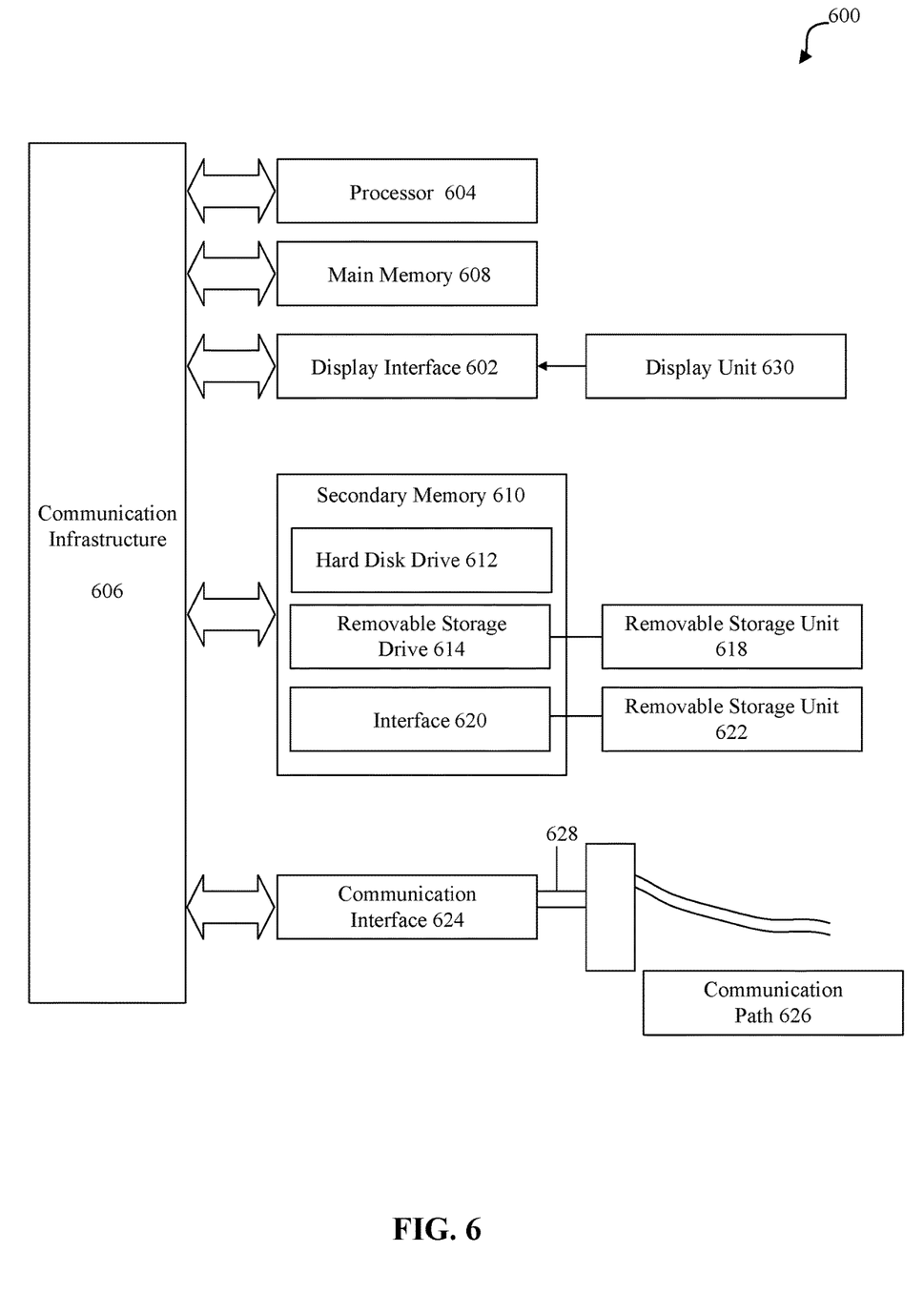
FIG. 6 is an example of a block diagram illustrating various hardware components and other features of a computer system that may operate the access control system in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 6 is an example of a block diagram illustrating various hardware components and other features of a computer system that may operate the access control system in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 604, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 606, such as a bus (or any other use of "bus" herein), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP) among others.

Further, the connection between components of computer system 600, or any other type of connection between computer-related components described herein can be referred to an operable connection, and can include a connection by which entities are operably connected, such that signals, physical communications, and/or logical communications can be sent and/or received. An operable connection can include a physical interface, a data interface and/or an electrical interface.

Computer system 600 can include a display interface 602 that forwards graphics, text, and other data from the communication infrastructure 606 (or from a frame buffer not shown) for display on a display unit 630. Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614.

As will be appreciated, the removable storage unit 618 includes a computer usable storage medium having stored therein computer software and/or data.

In alternative aspects, secondary memory 610 can include other similar devices for allowing computer programs or other instructions to be loaded into computer system 600. Such devices can include, for example, a removable storage unit 622 and an interface 620. Examples of such can include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

It should be understood that a memory, as used herein can include volatile memory and/or non-volatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 600 can also include a communications interface 624. Communications interface 624 allows software and data to be transferred between computer system 600 and external devices. Examples of communications interface 624 can include a modem, a network interface (such as an Ethernet card), a communications port, a Personal Computer Memory Card International Association (PCMCIA) slot and card, etc. Software and data transferred via communications interface 624 are in the form of signals 628, which can be electronic, electromagnetic, optical or other signals capable of being received by communications interface 624. These signals 628 are provided to communications interface 624 via a communications path (e.g., channel) 626. This path 626 carries signals 628 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 614, a hard disk installed in hard disk drive 612, and signals 628. These computer program products provide software to the computer system 600. Aspects of the disclosure are directed to such computer program products.

Computer programs (also referred to as computer control logic) are stored in main memory 608 and/or secondary memory 610. Computer programs can also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software can be stored in a computer program product and loaded into computer system 600 using removable storage drive 614, hard drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for integrating autonomous devices with an access control system, comprising:
   receiving, by the access control system, from an autonomous device, an access request for access to an elevator in a building, the access request further including an indication of a tailgating event associated with an entity detected to be following the autonomous device;
   validating, by the access control system, the access request by confirming that one or more security credentials that have been received within the access request had been assigned to the autonomous device by the access control system;
   creating, by the access control system, in response to successful validation of the access request and based on information received in the access request, a landing matrix that defines access to one or more floors of the building and includes a travel destination for the autonomous device within the building and indicates to first go to a desired floor of the entity that is tailgating the autonomous device;
   sending, by the access control system, the landing matrix to an elevator control system to grant the access to the autonomous device; and
   controlling elevator door opening and closing, elevator dispatch, and elevator security based on the one or more security credentials, including having an elevator first go to a floor associated with the entity detected to be following the autonomous device in response to the tailgating event.

2. The method of claim 1, wherein the autonomous device comprises one of: a robot and an Unmanned Aerial Vehicle (UAV).

3. The method of claim 1, wherein the access request comprises an encrypted message received from the autonomous device via an encrypted connection between the access control system and the autonomous device.

4. The method of claim 1, wherein sending the landing matrix comprises automatically sending, by the access control system, an elevator call to the elevator control system.

5. The method of claim 1, wherein the one or more security credentials include the travel destination for the autonomous device within the building.

6. The method of claim 1, further comprising auditing movement of the autonomous device based on the one or more security credentials.

7. The method of claim 1, further comprising opening an elevator door at a desired location for the autonomous device.

8. The method of claim 1, wherein the one or more security credentials are assigned to the autonomous device by one of a plurality of identity management systems each in communication with an authentication server, wherein the one or more security credentials are a same set of security credentials for each of the plurality of identity management systems.

9. The method of claim 1, wherein the access request comprises an encrypted message received from the autonomous device via an encrypted connection between the access control system and the autonomous device.

10. The method of claim 1, further comprising means for opening an elevator door at a desired location for the autonomous device.

11. The method of claim 1, wherein the one or more security credentials are assigned to the autonomous device by one of a plurality of identity management systems each in communication with an authentication server, wherein the one or more security credentials are a same set of security credentials for each of the plurality of identity management systems.

12. A system for integrating autonomous devices with an access control system, comprising:
    a hardware processor configured to:
    receive, by the access control system, from an autonomous device, an access request for access to an elevator in a building, the access request further including an indication of a tailgating event associated with an entity detected to be following the autonomous device;
    validate, by the access control system, the access request by confirming that one or more security credentials that have been received within the access request had been assigned to the autonomous device by the access control system;
    create, by the access control system, in response to successful validation of the access request and based on information received in the access request, a landing matrix that defines access to one or more floors of the building and includes a travel destination for the autonomous device within the building and indicates to first go to a desired floor of the entity that is tailgating the autonomous device;
    send, by the access control system, the landing matrix to an elevator control system to grant the access to the autonomous device; and
    controlling elevator door opening and closing, elevator dispatch, and elevator security based on the one or more security credentials, including having an elevator first go to a floor associated with the entity detected to be following the autonomous device in response to the tailgating event.

13. The system of claim 12, wherein the autonomous device comprises one of: a robot and an Unmanned Aerial Vehicle (UAV).

14. The system of claim 12, wherein the access request comprises an encrypted message received from the autonomous device via an encrypted connection between the access control system and the autonomous device.

15. The system of claim 12, wherein to send the landing matrix, the hardware processor is further configured to automatically send, by the access control system, an elevator call to the elevator control system.

16. The system of claim 12, wherein the one or more security credentials include the travel destination for the autonomous device within the building.

17. The system of claim 12, wherein the hardware processor is further configured to audit movement of the autonomous device based on the one or more security credentials.

18. The system of claim 12, wherein the hardware processor is further configured to open an elevator door at a desired location for the autonomous device.

19. The system of claim 12, wherein the one or more security credentials are assigned to the autonomous device by one of a plurality of identity management systems each in communication with an authentication server, wherein the one or more security credentials are a same set of security credentials for each of the plurality of identity management systems.

20. An apparatus for integrating autonomous devices with an access control system, comprising:

means for receiving from an autonomous device, an access request for access to an elevator in a building, the access request further including an indication of a tailgating event associated with an entity detected to be following the autonomous device;

means for validating the access request by confirming that one or more security credentials that have been received within the access request had been assigned to the autonomous device by the access control system;

means for creating in response to successful validation of the access request and based on information received in the access request, a landing matrix that defines access to one or more floors of the building and includes a travel destination for the autonomous device within the building and indicates to first go to a desired floor of the entity that is tailgating the autonomous device;

means for sending the landing matrix to an elevator control system to grant the access to the autonomous device; and means for controlling elevator door opening and closing, elevator dispatch, and elevator security based on the one or more security credentials, including having an elevator first go to a floor associated with the entity detected to be following the autonomous device in response to the tailgating event.

* * * * *